US008837155B2

(12) United States Patent
Park et al.

(10) Patent No.: US 8,837,155 B2
(45) Date of Patent: Sep. 16, 2014

(54) MOBILE TERMINAL

(75) Inventors: Kyoungjoon Park, Seoul (KR); Jinsoo Jeong, Incheon (KR); Daewon Yoo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 13/447,068

(22) Filed: Apr. 13, 2012

(65) Prior Publication Data

US 2012/0262887 A1  Oct. 18, 2012

(30) Foreign Application Priority Data

Apr. 18, 2011 (KR) ........................ 10-2011-0035860

(51) Int. Cl.
*H05K 1/00* (2006.01)
*H04M 1/02* (2006.01)
*G06F 1/16* (2006.01)
*H04M 1/60* (2006.01)
*H04M 1/23* (2006.01)

(52) U.S. Cl.
CPC ........... *G06F 1/1624* (2013.01); *H04M 1/0237* (2013.01); *G06F 1/1683* (2013.01); *H04M 2250/22* (2013.01); *H04M 1/6041* (2013.01); *H04M 1/236* (2013.01); *G06F 1/1647* (2013.01); *H04M 2250/52* (2013.01)
USPC ................. 361/749; 361/679.01; 361/679.02; 361/730; 361/735; 361/728; 345/168; 345/169

(58) Field of Classification Search
USPC ............... 361/679.01, 679.02, 727, 730, 735, 361/725, 728; 345/168, 169
See application file for complete search history.

(56) References Cited

U.S. PATENT DOCUMENTS 8,189,349 B2 * 5/2012 Lee et al. ...................... 361/814
2007/0123318 A1 5/2007 Joo

FOREIGN PATENT DOCUMENTS

CN        1848863 A     10/2006

* cited by examiner

*Primary Examiner* — Robert J Hoffberg
*Assistant Examiner* — Hung Dang
(74) *Attorney, Agent, or Firm* — Birch, Stewart, Kolasch & Birch, LLP

(57) ABSTRACT

A mobile terminal includes a first body and a second body, a first display unit mounted to the first body, and a slide module configured to move the first body and the second body with respect to each other. Further, the slide module includes a first slide member coupled to the first body, and a second slide member having a first bending portion and a second bending portion extending from a side end thereof in directions crossing each other, and configured to encompass at least part of side surfaces of the first slide member. In addition, the first bending portion and the second bending portion are spaced from at least one side surface of the first display unit with a predetermined gap from the side surface of the first display unit.

20 Claims, 8 Drawing Sheets

MOBILE TERMINAL

CROSS-REFERENCE TO RELATED APPLICATION

This application claims priority benefit to Korean Patent Application No. 10-2011-0035860, filed on Apr. 18, 2011, which is hereby incorporated by reference in its entirety.

BACKGROUND OF THE INVENTION

1. Field of the Invention

This disclosure relates to a mobile terminal having one body component that is slideable with respect to another body component.

2. Description of Related Art

As functions of user computing terminals become increasingly diversified, these modern terminals are able to support many complicated functions, such as: capturing still images and video, reproducing music and video files, playing games, receiving a variety of types of broadcast radio signals, and the like. By collectively implementing such functionality, these user terminals can be practically embodied in the form of a multimedia player device.

In general, such terminals may be classified as being mobile or portable and stationary or fixed, according to a various dynamic physical states or configuration they attain. Common mobile terminal can include a portable phone that has the functionality to: perform voice and video calls, receive input information, output information, store digital data, etc.

Various attempts have been made to implement more complicated functions and physical configurations of such a multimedia device by advanced hardware design and improved software.

BRIEF SUMMARY OF THE INVENTION

Therefore, one aspect of the present invention is to provide a mobile terminal having a simplified structure, employing a slide module for moving a first body and a second body with respect to each other. Another aspect of the present invention is to provide a mobile terminal that allows a mobile terminal's physical structure to achieve a slimmer configuration, with a smaller form factor than that of related art mobile terminals.

To achieve these and other advantages, in accordance with an embodiment of the present invention, there is provided a mobile terminal including: a first body; a second body; a first display unit mounted to the first body; and a slide module configured to allow the first body and the second body to slide with respect to each other. The slide module includes a first slide member coupled to the first body, and a second slide member having a first bending portion and a second bending portion extending from a side end thereof in directions crossing each other, and configured to encompass at least part of side surfaces of the first slide member. The first bending portion and the second bending portion are spaced from side surfaces of the first display unit by a predetermined gap length.

In accordance with another aspect of the present invention, the first body may further include a first case and a second case which form the appearance thereof, and a recess portion formed at one surface of the second case such that the first display unit is mounted therein.

In accordance with yet another aspect of the present invention, the first slide member may include a through hole having a shape corresponding to the recess portion, and the recess portion may be at least partially inserted into the through hole when being coupled with the first slide member.

In accordance with a further aspect of the present invention, the slide module may further include an elastic driving unit configured to elastically connect the first slide member and the second slide member to each other.

In accordance with yet a further aspect of the present invention, the first body may be integrally formed with part of the sliding module such that a distance between the display unit and one end of the elastic driving unit becomes narrow.

According to another aspect of the present invention, there is provided a mobile terminal including: a first body and a second body connected to each other such that a closed state and an opened state can be implemented; and a slide module configured to slideably connect the first body and the second body. The slide module includes a first slide member fixed to the first body and a second slide member having a rail groove on a side surface of the first slide member, such that the first slide member is inserted there into, to be slideable therewith. The display unit is mounted to the first body and the rail groove is disposed in the same plane with a predetermined distance there between, so as to prevent lamination therewith.

The scope of applicability of the present application will become more apparent from the combined teaching detailed description and the drawings. It should be understood that the detailed description and the specific examples provided therein, while elucidating various representations associated with the invention, are given for illustration purposes only. As would be understood by those skilled in the art at the time of the present invention, various changes and modifications may be made to the disclosure, without departing from spirit and scope of the claimed invention.

BRIEF DESCRIPTION OF THE DRAWINGS

The accompanying drawings, which are included to provide for further understanding of the disclosure, and are incorporated into, and constitute a part of, the specification, illustrate exemplary embodiments disclosed in the detailed description, and serve to help further explain the teachings therein. In the drawings.

DETAILED DESCRIPTION OF THE INVENTION

Description will now be given in detail of the exemplary embodiments of the disclosure, with reference to the accompanying drawings. For the sake of brevity, similar or equivalent components will be provided with the same reference numbers, and as such, description thereof will not be repeated.

Hereinafter, a mobile terminal according to the present invention will be explained in more detail with reference to the attached drawings.

Figure 1:
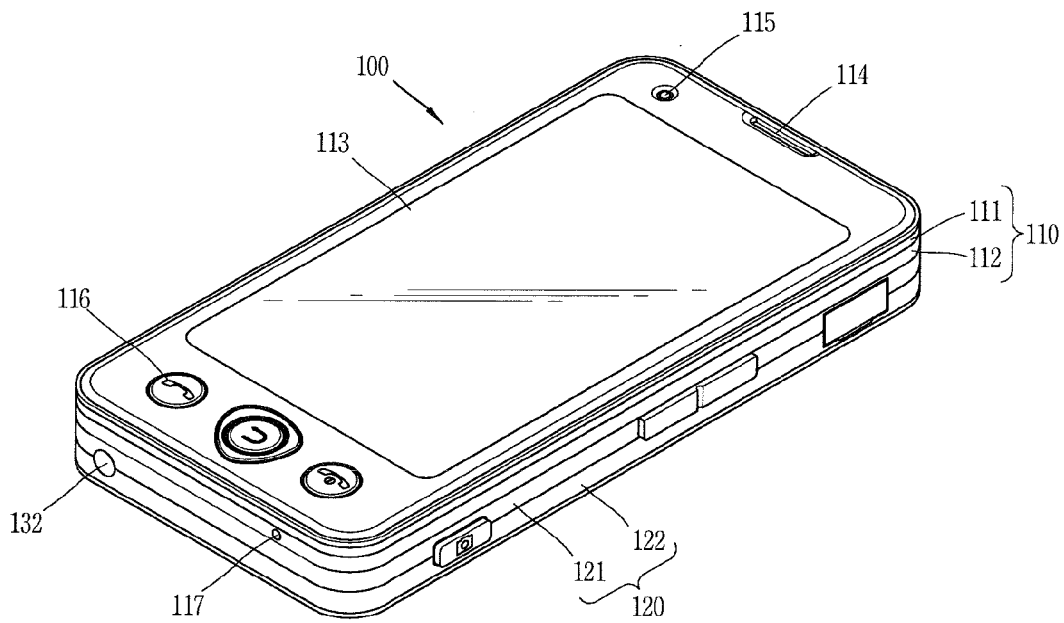
FIG. 1 is a perspective view showing a closed state of a mobile terminal according to one embodiment of the disclosure.
Figure 2:
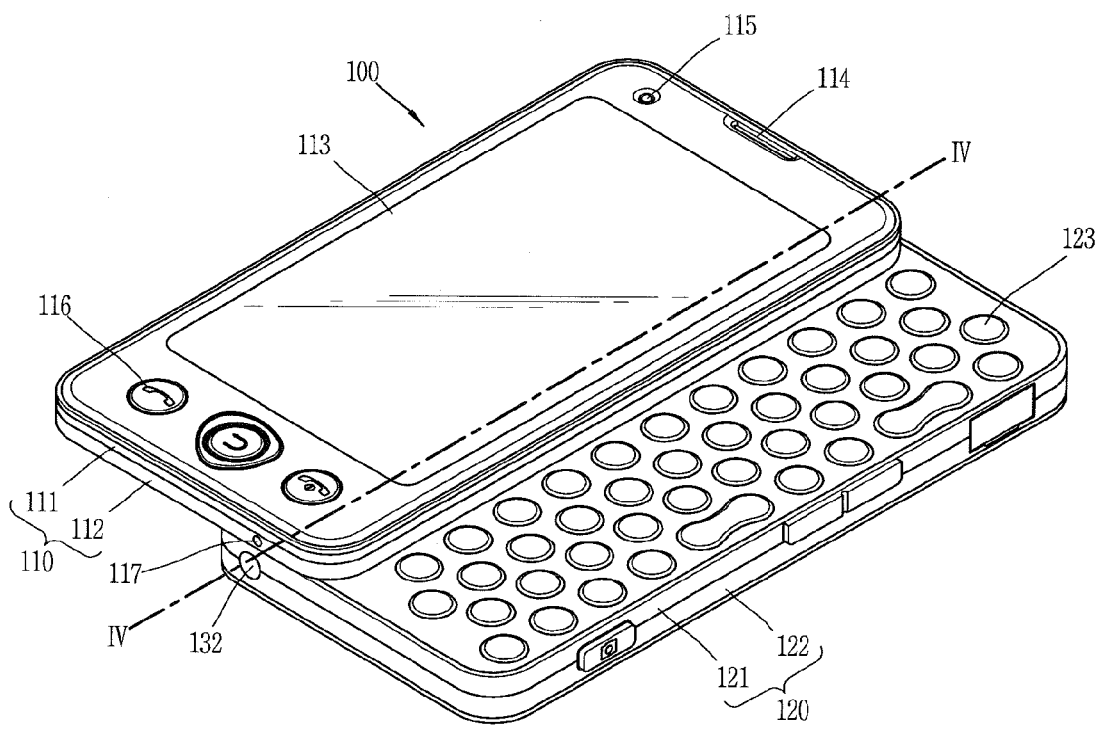
FIG. 2 is a perspective view showing an opened state of the mobile terminal depicted in FIG. 1.

FIG. 1 is a perspective view showing a closed state of a mobile terminal according to one embodiment of the present invention, and FIG. 2 is a perspective view showing an opened state of the mobile terminal depicted in FIG. 1. As shown in FIGS. 1 and 2, the mobile terminal 100 includes a first body 110, and a second body 120 coupled to the first body 110 so as to perform a relative sliding operation.

Referring to FIGS. 1 and 2, the mobile terminal 100 implements an opened configuration by a horizontal (widthwise) sliding. However, the mobile terminal 100 may also implement an opened configuration by a vertical (lengthwise) sliding.

As shown in FIG. 1, a state where the first body 110 and the second body 120 are positioned or arranged to overlap each other is referred to a 'closed configuration.' As shown in FIG. 2, a state where one or more parts of the second body 120 are exposed, when the first body 110 moves in a planar direction is referred to as an 'opened configuration.' In the opened configuration, the first body 110 performs sliding with respect to the second body 120. However, the present invention is not limited to this. For instance, one of the first body 110 and the second body 120 may perform swing or swivel movements with respect each other, without departing from the spirit and scope of the present invention.

The mobile terminal 100 can operate in a 'standby mode' while in the closed configuration. However, the standby mode may be released according to a user's manipulations of a state or a configuration of the mobile terminal 100. The mobile terminal 100 can also operate in a 'call mode,' in the opened configuration. However, the call mode may be converted into the standby mode according to a user's manipulation of the mobile terminal 100 or according to a lapse of predetermined time.

Types of components to be disposed on upper surfaces of the first body 110 and the second body 120 may be determined according to a function or a user interface emphasized by the mobile terminal 100. For instance, a display unit 113 may be disposed on an upper surface of the first body 110, and a second manipulation portion 123, depicted in FIG. 2, for inputting a command may be disposed on an upper surface of the second body 120.

An audio output unit 114 may be implemented as a receiver or a speaker, and a first image input unit 115 may be implemented as a camera module for capturing a still image or a moving image of a user, among other things. A first manipulation portion 116 is configured to receive a command for controlling the operation of the mobile terminal 100 according to a first embodiment of the present invention. An audio input unit 117 may be implemented in the form of a microphone. The audio input unit 117 may be arranged to be symmetrical to the audio output unit 114 based on the position of the display unit 113.

Similar to the first body 110, the second body 120 may be formed by a front case 121 and a rear case 122. The second manipulation portion 123, depicted in FIG. 2, may be disposed on a front surface of the front case 121 of the second body 120. A broadcast signal receiving antenna 132 may be disposed at one side of the second body 120, in addition to an antenna for communications. The broadcast signal receiving antenna 132 may be configured to retract into the second body 120.

Referring to FIG. 2, once the first body 110 is slid with respect to the second body 120, the second manipulation portion 123 disposed on a front surface of the second body 120, and overlapped with the first body 110 in the closed configuration (the configuration depicted in FIG. 1) is exposed to the outside with respect to the first body 110.

A user may input a command relevant to information output from the display unit 113, through keys of the exposed second manipulation portion 123. The second manipulation portion 123 may include an alphabetical keys (i.e., consonants and vowels of any preferred language) and/or numeric keys, or any combination thereof. The alphabetical keys may be arranged in a QWERTY arrangement, to allow a user to easily generate a text message, a memo, an e-mail, etc.

If the second manipulation portion 123 is implemented as a touch screen, icons of function keys may be output to the exposed part of the touch screen 113 so that a user can perform an input in a touch manner. For instance, if a moving image is output to the display unit 113, function keys may be configured to receive commands for temporary stop, play back, backward, forward, displaying a play-back list, etc.

Although the second manipulation portion 123 is depicted on a front surface of the second body 120, the present invention is not limited to this particular arrangement. For instance, a second display unit interworked with the display unit 113 may just as well be arranged on a front surface of the second body 120.

Figure 3:
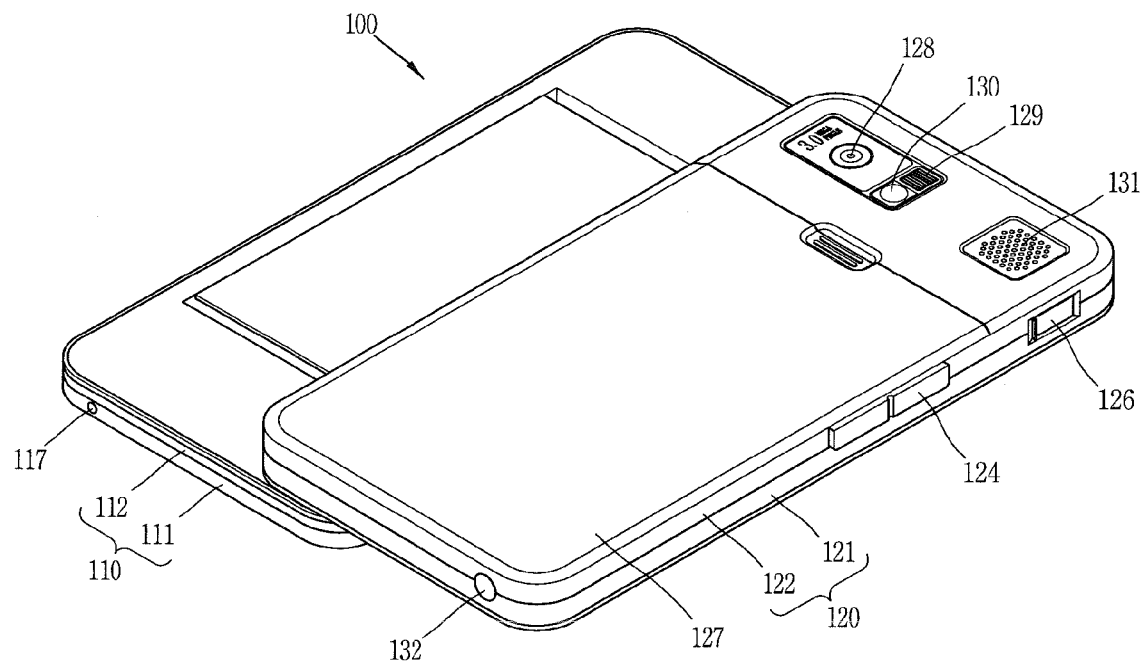
FIG. 3 is a perspective view showing a rear surface of the mobile terminal in the opened state as depicted in FIG. 2.

Next, FIG. 3 is a perspective view showing a rear surface of the mobile terminal 100 of FIG. 2. In FIG. 3, a third manipulation portion 124, an interface 126, etc., may be disposed on a side surface of the mobile terminal 100 adjacent to a main surface of the second body 120.

The first through the third manipulation portions 116, 123 and 124 of the mobile terminal 100 may be collectively referred to as user input portions, and can include any type of manual or haptic feedback that can be input to the mobile terminal 100 by a user. By way of example, user input portion (s) may be implemented as a dome switch, a touch screen, or a touch pad for receiving a command or information by a user's push or touch operation. Alternatively, user input portion(s) may also be implemented as a wheel for rotating a key, as well as a jog wheel or a jog switch.

The first manipulation portion 116 may be configured to input common commands, such as START, END, and SCROLL, and the second manipulation unit 123 may be configured to input numbers, characters, symbols, etc. The third manipulation portion 124 may operate as a set of hot keys for performing a specific function, such as activating the first image input unit 115.

The interface 126 may serve as a route through which the mobile terminal 100 can exchange data with one or more external device(s). For instance, the interface 126 may be implemented as at least one of a wired or wireless connection port for connecting an external earphone or headset (not shown) to the mobile terminal 100, a short-range communications port (e.g., an Infrared Data Association (IrDA) port, a Bluetooth port, a wireless LAN port, etc.), a power supply port for providing power to the portable terminal 100, or the like.

The interface 126 may also be configured using a card socket (e.g., for coupling to a memory card, a subscriber identity module (SIM) card, a user identity module (UIM) card, etc.). A power supply unit 127 for supplying power to the mobile terminal 100 is mounted at the second body 120.

The power supply unit 127 may be a rechargeable battery, for example, to be detachably mounted to the second body 120 for charging.

A second image input unit 128 may be mounted to the rear case 122 of the second body 120. The second image input unit 128 faces a direction which is opposite to a direction faced by the first image input unit 115 (refer to FIG. 1), and may have an image resolution different from that of the first image input unit 115. For example, the first image input unit 115 may operate with relatively lower pixel count resolution as compared to the second input image unit 128. Thus, the first image input unit 115 may be preferred when a user capture's a streaming image of his face during video call or video chat mode. On the other hand, the second image input unit 128 may operate with a relatively higher pixel count resolution, such that it is preferred when a user desires to obtain a higher quality still picture, which can be saved at a resident or plug-in memory (not shown) of the mobile terminal 100, for later use.

A flash 129 and a mirror 130 may be additionally disposed adjacent to the second image input unit 128. When capturing an object image, while using the second image input unit 128, the flash 129 can cast light upon the object at the time the image is captured. The mirror 130 can cooperate with the second image unit 128 to allow a user to photograph himself or herself in a self-portrait mode. A second audio output unit 131 may be disposed at the rear case 122. The second audio output unit 131 may implement a stereo function together with the first audio output unit 114 (refer to FIG. 1), and may be used for calling in a speaker phone mode.

It was explained that the second image input unit 128 is disposed at the rear case 122. However, the position of the second image input unit 128 is not limited to being positioned at the rear case 122. For example, at least one of the components 128 to 131 originally disposed at the rear case 122 may alternatively be mounted to the rear case 112 of the first body 110. In this case, the components disposed at the rear case 112 may be protected by the second body 120 in the closed configuration. Furthermore, even if the second image input unit 128 is not additionally provided, the first image input unit 115 may be configured to be rotatable to also capture an image in a capturing direction of the second image input unit 128.

Figure 4:
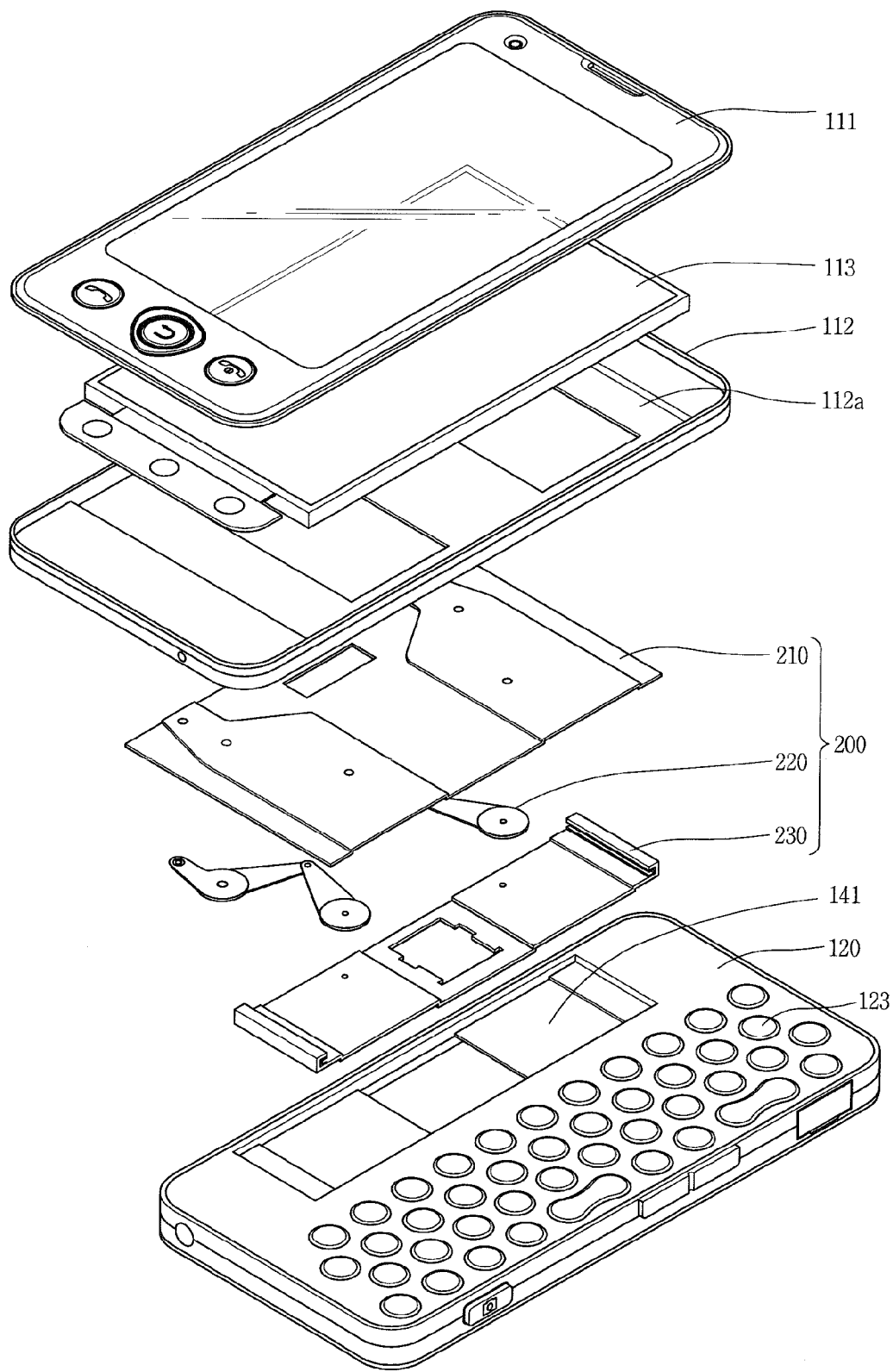
FIG. 4 is an exploded perspective view of the mobile terminal as depicted in FIG. 1.
Figure 5:
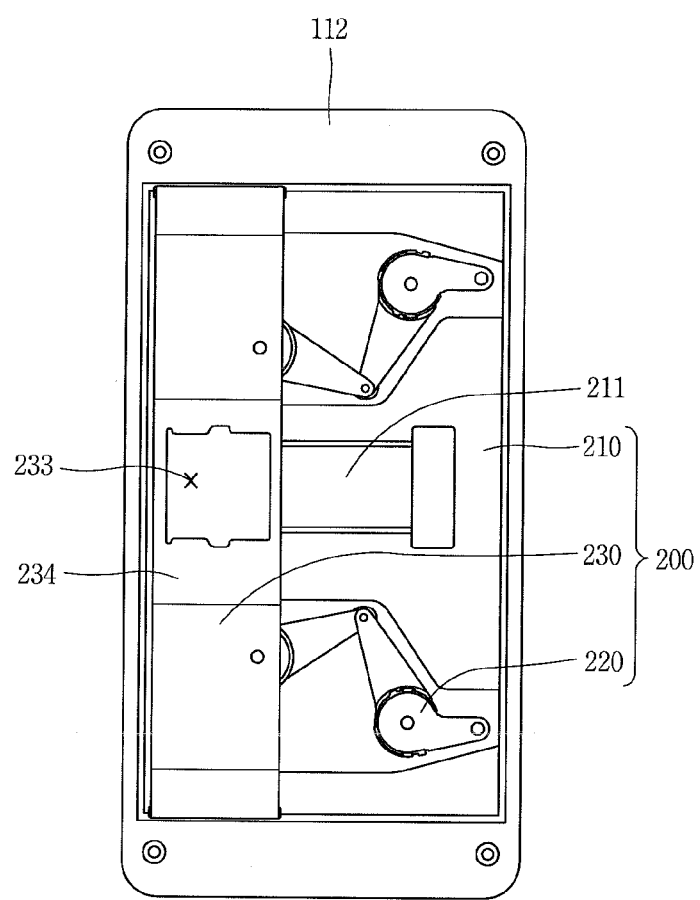
FIG. 5 is an exposed view of a rear surface of a first body of the mobile terminal depicted in FIG. 1.
Figure 7:
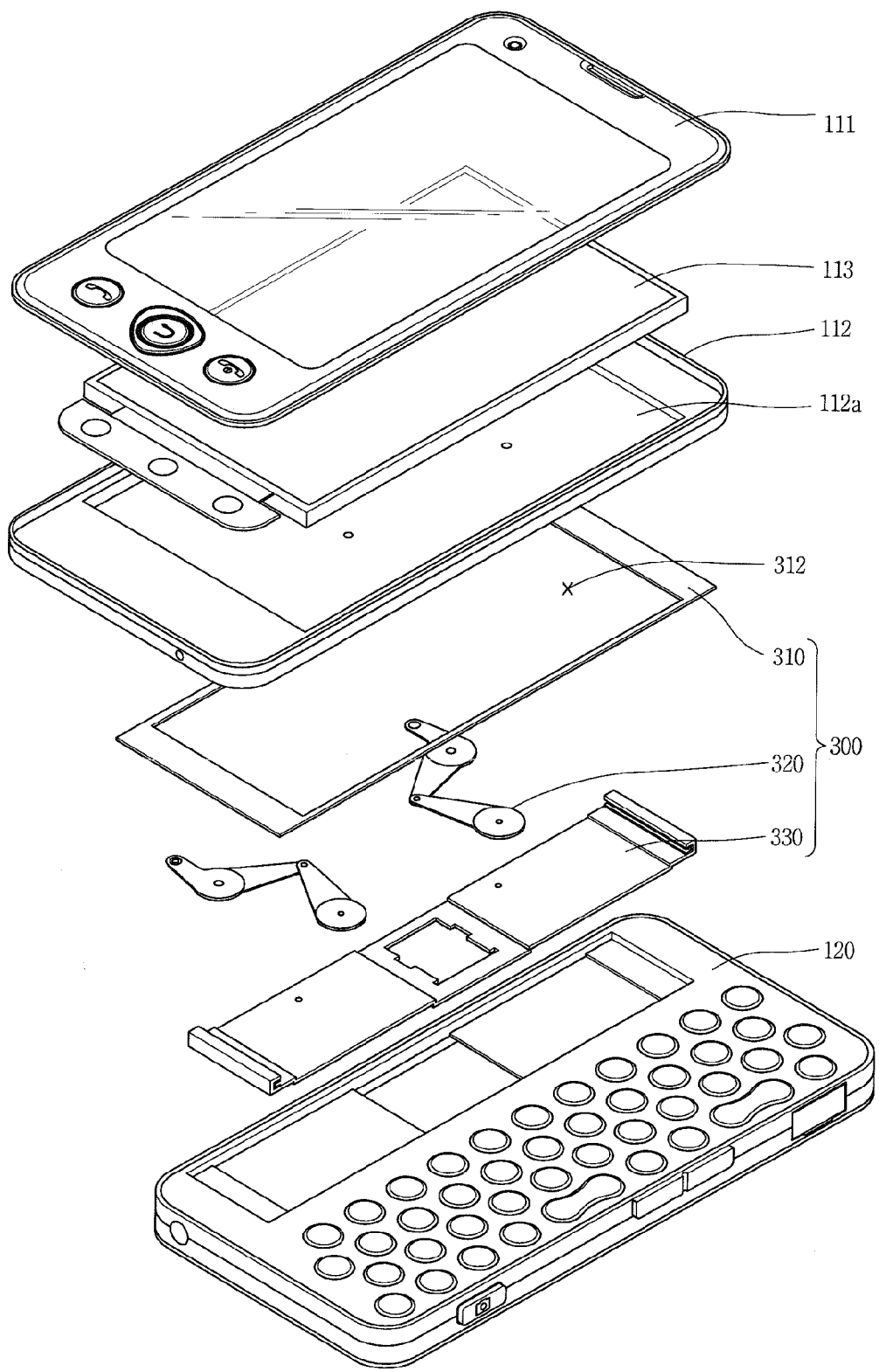
FIG. 7 is an exploded perspective view of a mobile terminal, according to another embodiment of the present invention.

The first body 110 and the second body 120 are connected to each other by a slide module 200 or 300, respectively depicted in FIGS. 4 and 5 or FIG. 7, so that the second body 120 can be slid when the first body 110 is slid. The slide module 200 or 300 can be configured to slide the first body 110 with respect to the second body 120 in a closed state and an open state. When the first body 110 is slid with respect to the second body 120, a front surface of the second body 120 has a larger exposed area. As the exposed area increases, as depicted in FIG. 2, the mobile terminal 100 may have enhanced hardware functionality. For instance, alphabetic keys and numeric keys of the second manipulation portion 123 may be formed to have a relatively large size and the corresponding usability of the second manipulation portion 123 may improve with the increase exposure.

Figure 6A:
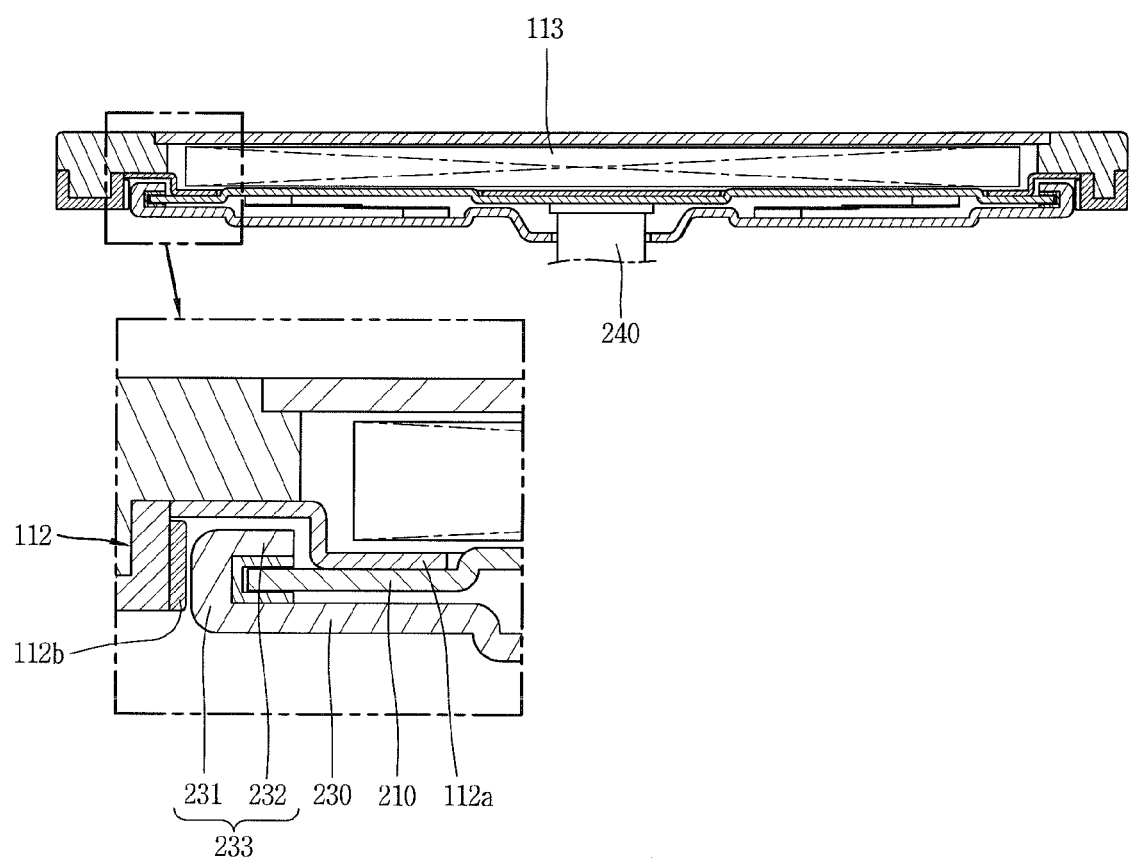
FIG. 6A is a sectional view of the first body taken along line IV-IV depicted in FIG. 2, showing the sliding module configuration of the mobile terminal.
Figure 6B:
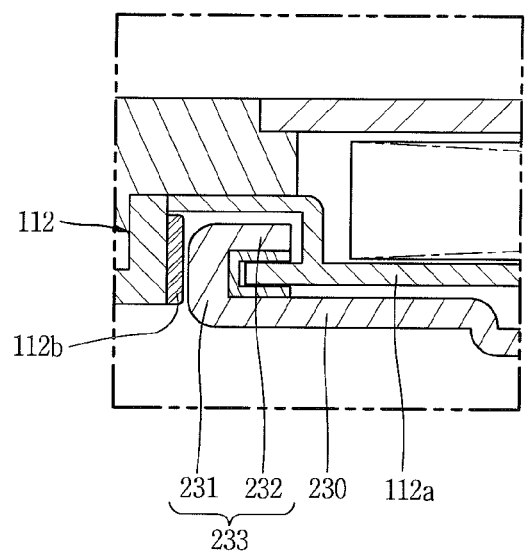
FIG. 6B is a sectional view showing a modification to the second case of the mobile terminal depicted in FIG. 6A.

FIG. 4 is an exploded perspective view of the mobile terminal of FIG. 1. FIG. 5 is an exposed view of a rear surface of the first, upper body 110. FIG. 6A is a sectional view of the first body 110, which is taken along line IV-IV in FIG. 2, and FIG. 6B is a view showing a modification example of the first body 110 in FIG. 6A.

Referring to FIGS. 1 and 4, a case forming the appearance of the first body 110 (casing, housing, cover, etc.) is formed by a front case 111 and a rear case 112. Each kind of electronic components are capable of being mounted in a space formed by the front case 111 and the rear case 112. If desired, one or more intermediate cases may be provided between the front case 111 and the rear case 112. The front and rear cases may be formed by injection-molding resin material, or formed using metallic material such as stainless steel (STS) and titanium (Ti), among other common manufacturing processes.

The display unit 113, an audio output unit 114, a first image input unit 115, a first manipulation portion 116, and an audio input unit 117 may be displayed on the front case 111 of the first body 110 with reference to FIG. 1. The display unit 113 may include a display module for visually displaying information, such as a Liquid Crystal Display (LCD) module or an Organic Light Emitting Diodes (OLED) module, and a Transparent OLED (TOLED) module.

The display unit 113 may also be configured to further include a touch screen for allowing information to be input by a user's touch (e.g., via haptic feedback). For a call connection, the display unit 113 may be configured to display numeric keys which can be input by a user's touch. The display unit 113 may further be configured to generate various tactile responses when being touched by a user. This may be implemented by a haptic module (not shown) interworking with the display unit 113. A representative tactile response generated by the haptic module can includes vibration or pulsation. The haptic module may be arranged according to a preferred configuration of the display unit 113, as well as that of the mobile terminal 100.

The mobile terminal 100 also includes a first body 110, a second body 120, a first display unit 113 and a slide module 200. The slide module 200 may include a first slide member 210, an elastic driving unit 220 and a second slide member 230. The first slide member 210 can be fixed to the first body 110. The first slide member 210 may be configured to slideably move after being partially or entirely inserted into a rail groove 233 of the second slide member 230.

The rail groove 233 may include a first bending portion 231 and a second bending portion 232 crossing each other. The first bending portion 231 is bent from a side end of the second slide member 230 by a predetermined angle, and the second bending portion 232 is bent to cross the first bending portion 231. The first bending portion 231 and the second bending portion 232 form the rail groove 233. More concretely, the first bending portion 231 and the second bending portion 232 are bent in directions crossing each other so as to encompass a side surface of the first slide member 210. The rail groove 233 is formed so that the first slide member 210 can be inserted to slideably move.

The rail groove 233 may be disposed on the same plane as the first display unit 113 with a distance therebetween so as to prevent lamination on the first display unit 113. This reduces a thickness of the first body 110. For instance, if the first display unit 113, the second case 112, the first slide member 210 and the second slide member 230 are sequentially laminated on each other, and the rail groove 233 is disposed on a lower surface of the first display unit 113, a thickness of the first body 110 may become thick by a thickness of the second bending portion 232. However, the rail groove 233 need not be disposed on a lower surface of the first display unit 113, but can instead be disposed on the same plane as the first display unit 113 within a preset distance therebetween. This reduces a thickness of the first body 110 by at least the thickness of the second bending portion 232.

In the related art, a rail groove is generally disposed on a first display unit, and the first display unit is typically pressurized and may have an impact, due to an elastic force or a restoration fore of a spring when a sliding operation is completed. In contrast, with respect to the mobile terminal 100 of the present invention, the rail groove 233 is not necessarily disposed on a lower surface of the first display unit 113, but is instead disposed on the same plane as the first display unit 113 within a predetermined distance therebetween. This spacing reduces pressurization and an impact of the first display unit 113, because a distance between one end of the elastic driving unit 220 and each respective component inside the first body 110 is advantageously shorter in length, as compared to that achieved in the conventional art.

A speaker or a microphone not requiring high impact endurance can also be disposed in a space implemented on a side surface of the rail groove 233 and defined by the front case 121 and the second case 122. Accordingly, a design degree of freedom is enhanced in the present disclosure.

A protrusion 234 having one surface protruding toward the second body 120 so as to be mounted to the second body 120 is formed at the second slide member 230. The protrusion 234 is a gap between the first body 110 and the second body 120, which may prevent an external structure such as a thin plate type card from being inserted and from directly contacting a flexible printed circuit board (FPCB) 240, with reference to FIGS. 6A and 8. Specifically, the protrusion 234 may prevent damage of the FPCB 240 by employing an optional external structure such as a card (not shown).

The protrusion 234 may be provided with a hole through which the FPCB 240 passes, the FPCB 240 for allowing a signal to be exchanged between the first body 110 and the second body 120. A recess 211 is formed at one surface of the first slide member 210. The FPCB 240 may be disposed at the recess 211, depicted in FIG. 5, of the first slide member 210.

Once a state of the mobile terminal is converted to an opened state from a closed state, the FPCB 240 may be bent or may overlap with each other due to its length. Accordingly, the FPCB 240 can be configured to have a length long enough for two ends thereof to be coupled to the first body 110 and the second body 120. In this scenario, the FPCB is preferably arranged so as to have an 'S' shape when two ends thereof are coupled to the first body 110 and the second body 120. The FPCB 240 may be protected by the protrusion 234, via its hole, and the recess 211 of the first slide member 210.

As aforementioned, the first body 110 may include the front case 111 and the rear case 112 which form the appearance.

The front case 111 or the rear case 112 can be provided with a guide portion 112b disposed near the rail groove 233 so as to roll-contact with the rail groove 233 when the first body 110 is slid. Especially, the guide portion 112b may be disposed to face the first bending portion 231 of the rail groove 233, and is formed of an elastic body. This allows the guide portion 112b to prevent deformation of the rail groove 233 in a side direction when the first body 110 is slid.

The second case 112 can include a recess portion 112a formed at one surface of the second case 112 with a predetermined depth. The first display unit 113 may be mounted to the recess portion 112a. This prevents movements of the first display unit 113 in a side direction. In this configuration, no additional components are required for preventing movements of the first display unit in a horizontal direction. This advantageously results in a light weight of the mobile terminal, and a simplified manufacturing process of the mobile terminal 100.

The first slide member 210 can be attached to the recess portion 112a so as to cover the recess portion 112a. As shown in FIG. 6B, the first slide member 210 and the second case 112 may be integrally formed. In this instance, a thickness of the first body 110 may be reduced by a thickness of the first slide member 210. A mounting recess for mounting the second slide member 230 can be formed at the second body 120. The mounting recess may be formed at one surface of the second body 120 with a predetermined depth, thereby allowing the first body 110 and the second body 120 to slide while maintaining a preferred gap spacing there between. This mounting recess can be configured to mount with part of the protrusion 234.

Figure 8:
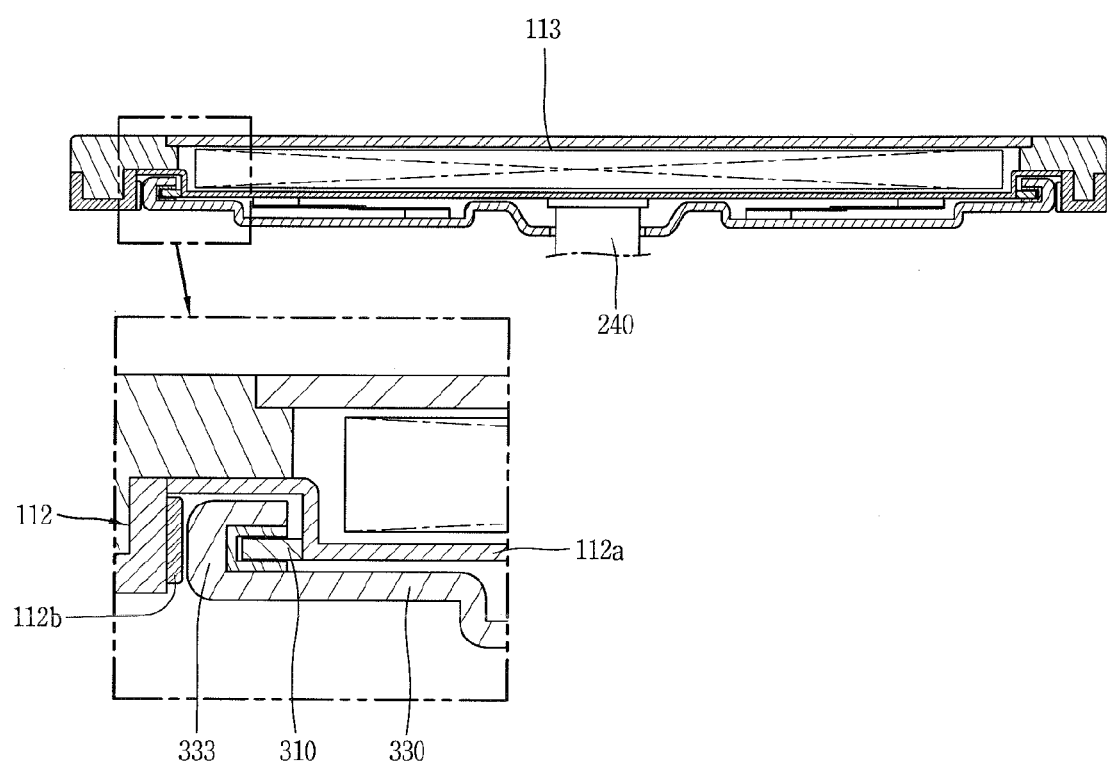
FIG. 8 is a sectional view of a first body, which is taken along line IV-IV depicted FIG. 2, according to another embodiment of the present invention.

FIG. 7 is an exploded perspective view of the mobile terminal 100 of FIG. 1, according to another embodiment of the disclosure, and FIG. 8 is a sectional view of a first body, which is taken along line IV-IV in FIG. 2 according to the embodiment of FIG. 7. In this configuration, the mobile terminal 100 includes a first body 110, a second body 120, a display unit 113, and a slide module 300. The slide module 300 may include a first slide member 310 and a second slide member 320.

The first slide member 310 can be provided with a through hole 312 having a shape corresponding to the recess portion 112a of the second case. As shown, the through hole 312 may be formed so that the recess portion 112a can be inserted thereinto. When the recess portion 112a is inserted into the through hole 312, the recess portion 112a and the first slide member 310 can be arranged on the same plane, without being laminated on each other.

When the recess portion 112a is inserted into the through hole 312, the first body 110 has a thinner thickness. As the display unit 113, the second case 112, the first slide member 310, the second bending portion of the rail groove 233, and the second sliding member 320 are sequentially laminated on each other in a thickness direction, the mobile terminal 100 can be assembled. However, in another embodiment of the present disclosure, only the display unit 113, the second case 112 and the second slide member 320 may be laminated on each other in a thickness direction. This reduces a thickness of the mobile terminal 100 by a corresponding thickness of the second bending portion 333 and the first slide member 310.

The present invention can achieve the following advantageous features:

1. The rail groove is not disposed below the display unit, but it can instead be disposed on the same plane as the display unit with a distance there between, to reduce a thickness of the first body by a thickness of the second bending portion; and 2. No additional components are required to prevent movements of the display unit in a horizontal direction, which can result in a reduced physical weight of the mobile terminal, and correspondingly simplify and improve the manufacturing process.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a first body and a second body;
a first display unit mounted to the first body; and
a slide module configured to move the first body and the second body with respect to each other, wherein the slide module comprises:
a first slide member coupled to the first body; and
a second slide member having a first bending portion and a second bending portion extending from a side end thereof and configured to encompass a portion of a side surface of the first slide member,
wherein the first bending portion and the second bending portion are disposed on at least one side surface of the first display unit, within a predetermined spacing from the side surface of the first slide member, and
wherein the second slide member further comprises a protrusion protruding from one surface of the second slide member toward the second body.

2. The mobile terminal of claim 1, wherein the first body further comprises:
a first case and a second case which collectively form the first body; and
a recess portion formed at one surface of the second case such that the first display unit is mounted in.

3. The mobile terminal of claim 2, wherein the first slide member is formed at the recess portion so as to substantially cover the recess portion.

4. The mobile terminal of claim 2, wherein the first slide member further comprises a through hole having a shape corresponding to the recess portion, and a portion of the recess portion is disposed in the through hole when coupled with the first slide member.

5. The mobile terminal of claim 2, wherein the first case or the second case further comprises a guide portion disposed near the second slide member so as to movably contact the second slide member when the first body is slid.

6. The mobile terminal of claim 2, wherein the first slide member and the second case are integrally formed with each other.

7. The mobile terminal of claim 1, wherein the protrusion further comprises a hole through which a flexible printed circuit board (FPCB) passes, and the FPCB allows data to be exchanged between the first body and the second body.

8. The mobile terminal of claim 7, wherein the first slide member further comprises a recess formed at one surface thereof such that the FPCB is positioned along the recess.

9. The mobile terminal of claim 1, wherein the second body further comprises a manipulation portion exposed or covered by sliding actions, and
wherein the manipulation portion is a second display unit configured to display visual information relevant to the first display unit, or is implemented as a keypad having a plurality of key buttons configured to receive user input.

10. The mobile terminal of claim 1, wherein the slide module further comprises an elastic driving unit configured to elastically connect the first slide member and the second slide member to each other.

11. The mobile terminal of claim 10, wherein the first body is integrally formed with a portion of the sliding module such that a spacing between the first display unit and one end of the elastic driving unit is narrowed.

12. A mobile terminal, comprising:
a first body and a second body connected to each other in such a way as to enable the mobile terminal achieving both a closed state and an open state; and
a slide module configured to slideably connect the first body and the second body,
wherein the slide module comprises:
a first slide member fixed to the first body; and
a second slide member having a rail groove on a side surface of the first slide member such that a portion of the first slide member can be inserted into the rail groove to be slideable therein,
wherein a display unit mounted to the first body and the rail groove are disposed on the same plane with a spacing there between that prevents lamination therewith, and
wherein the second slide member further comprises a protrusion protruding from one surface of the second slide member toward the second body.

13. The mobile terminal of claim 12, wherein the second slide member is coupled to the second body.

14. The mobile terminal of claim 12, wherein the first body further comprises:
a first case and a second case which form an exterior of the first body; and
a recess portion formed at one surface of the second case such that the display unit is mounted thereto.

15. The mobile terminal of claim 14, wherein the first slide member is formed on the recess portion to cover the recess portion.

16. The mobile terminal of claim 14, wherein the first slide member further comprises a through hole having a shape corresponding to the recess portion, and a portion of the recess portion is disposed in the through hole when coupled with the first slide member.

17. The mobile terminal of claim 14, wherein the first case or the second case further comprises a guide portion disposed near the rail groove so as to movably contact the second slide member when the first body is slid.

18. The mobile terminal of claim 17, wherein the first body is integrally formed with a portion of the sliding module such that a spacing between the display unit and one end of the elastic driving unit is narrowed.

19. The mobile terminal of claim 12, wherein the protrusion further comprises a hole through which a flexible printed circuit board (FPCB) passes, and the FPCB allows data to be exchanged between the first body and the second body.

20. The mobile terminal of claim 12, wherein the slide module further comprises an elastic driving unit configured to elastically connect the first slide member and the second slide member to each other.

* * * * *